(12) United States Patent
Livesay (10) Patent No.: US 8,025,346 B2
(45) Date of Patent: Sep. 27, 2011

(54) MACHINE COMPONENT CONFIGURATION FOR ENHANCED PRESS FIT AND PRESS FIT COUPLING METHOD

(75) Inventor: Richard E. Livesay, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 510 days.

(21) Appl. No.: 11/639,795

(22) Filed: Dec. 15, 2006

(65) Prior Publication Data
US 2008/0141513 A1    Jun. 19, 2008

(51) Int. Cl.
F16B 21/18    (2006.01)
(52) U.S. Cl. ........................................ 305/106
(58) Field of Classification Search .......... 305/102–106, 305/118
See application file for complete search history.

(56) References Cited

U.S. PATENT DOCUMENTS

| | | | |
|---|---|---|---|
| 3,648,325 A | 3/1972 | Cartwright et al. | |
| 4,134,384 A | 1/1979 | Schafft et al. | |
| 4,196,908 A | 4/1980 | Rose et al. | |
| 4,346,321 A | 8/1982 | Frister | |
| 4,618,190 A * | 10/1986 | Garman et al. | 305/204 |
| 4,741,091 A | 5/1988 | Settles | |
| 4,785,732 A | 11/1988 | Czapka et al. | |
| 4,798,046 A | 1/1989 | Stauffer et al. | |
| 4,828,467 A | 5/1989 | Brown | |
| 4,886,392 A | 12/1989 | Iio | |
| 4,958,997 A | 9/1990 | Harwath | |
| 4,993,328 A | 2/1991 | Wendt et al. | |
| 5,142,939 A | 9/1992 | Bauer et al. | |
| 5,176,044 A | 1/1993 | Bauer et al. | |
| 5,183,318 A | 2/1993 | Taft et al. | |
| 5,301,877 A | 4/1994 | Madison | |
| 5,716,156 A | 2/1998 | Bayer et al. | |
| 5,732,985 A | 3/1998 | Suzuki | |
| 5,797,589 A | 8/1998 | Kalebjian et al. | |
| 5,797,727 A | 8/1998 | Peters et al. | |
| 5,887,958 A | 3/1999 | Bissi et al. | |
| 5,960,754 A | 10/1999 | Sugimoto et al. | |
| 6,010,321 A | 1/2000 | Forsythe et al. | |
| 6,039,536 A | 3/2000 | Van De Venne et al. | |
| 6,042,429 A | 3/2000 | Bianca et al. | |

(Continued)

FOREIGN PATENT DOCUMENTS

EP    0716975    6/1996

Primary Examiner — Jason Bellinger
(74) Attorney, Agent, or Firm — Liell & McNeil (57) ABSTRACT

A machine is provided including a frame and at least one track, such as first and second ground engaging tracks, coupled with the frame. A plurality of pins are provided which each couple together at least two of the links of the tracks and include an outer diameter, a first end and a second end. The first and second ends of the pin may be press fit in first and second bores of first and second links of the tracks, respectively. A non-directional surface finish along a first portion of the length of the pin within the first bore forms a fluid seal with the first bore, whereas a directional surface finish along a different portion of the length of the pin within the first bore inhibits removal of the first end of the pin from the first bore. A method of coupling together machine components via an enhanced press fit is further provided, utilizing a pin having a first surface finish configured to form a fluid seal with a bore of a machine component, and a second surface finish configured to inhibit removal of the pin from the bore.

17 Claims, 5 Drawing Sheets

U.S. PATENT DOCUMENTS

| | | |
|---|---|---|
| 6,142,588 A | 11/2000 | Ketting et al. |
| 6,322,173 B1 | 11/2001 | Maguire et al. |
| 6,354,679 B1 | 3/2002 | Maguire et al. |
| 6,382,742 B1 | 5/2002 | Hasselbusch et al. |
| 6,386,651 B1 | 5/2002 | Gerardin et al. |
| 6,487,025 B2 | 11/2002 | Koiwai et al. |
| 6,698,762 B2 | 3/2004 | Newberg et al. |
| 6,805,385 B2 | 10/2004 | Viegener |
| 6,828,707 B2 | 12/2004 | Hasegawa et al. |
| 6,832,900 B2 | 12/2004 | Leu |
| 6,834,821 B2 | 12/2004 | Nagata et al. |
| 6,988,681 B2 | 1/2006 | Reiter |

* cited by examiner

MACHINE COMPONENT CONFIGURATION FOR ENHANCED PRESS FIT AND PRESS FIT COUPLING METHOD

TECHNICAL FIELD

The present disclosure relates generally to machines having components coupled together via press fits, and relates more particularly to a machine component and method wherein a press fit is enhanced via specialized surface finishes of press fit components.

BACKGROUND

Press fits are used across virtually all industries to couple together machine components. A component having a cylindrical outer diameter is typically pressed into a bore in a second component which includes a cylindrical inner diameter having an interference fit with the outer diameter of the first component. Press fitting the components creates a joint coupling them together. In many instances, the press fit between the components is intended to be permanent, and relatively strong forces are required to de-couple the components. Increasing the relative interference between the components can in some instances increase the "strength" of the press fit, however, there are limits to the practicability of this approach. In particular, too much interference between press fit components can result in galling of the materials' surfaces as they are pressed together, sometimes compromising the integrity of the joint, and certainly preventing re-assembly if the components are ever de-coupled. Various lubrication fluids, pre-heating techniques, and surface knurling strategies have been proposed as ways to enhance the strength of press fits. Nevertheless, certain machine environments are simply so rugged that still stronger press fits continue to be highly desirable.

Track-type machines such as those used in various earth moving, construction, mining and similar industries inherently operate in rugged environments, which can subject press fit joints in the machines to forces sufficient to affect their integrity. The ground engaging tracks of such machines must necessarily be relatively robust and capable of withstanding a wide variety of load types and wear. As such, the components and coupling hardware used in ground engaging tracks are typically manufactured and coupled together in a manner contemplated to provide as long a service life as possible. In certain instances, however, press fits between parts can be overcome by alternating loads on the track components, causing movement of one part relative to another. In extreme cases, movement of one of the parts relative to another part can cause failure of the joint. Moreover, even where failure does not ultimately occur, relative movement between the components can cause seals to become ineffective, lubricant to leak from the assembly, and contaminants to enter the joint. Over time, this phenomenon can also cause failure of the assembly or require expensive and undesired down time for repairs and maintenance.

In an attempt to reduce the tendency for certain track components to experience such failure and wear, engineers have developed a variety of means for increasing the relative strength of press fits used in the track environment. As alluded to above, increased interference between the parts can complicate manufacture and assembly. Leading chamfers and blends, relative hardness and finishes of the parts must also be relatively tightly controlled, and specialized lubricants used for differing amounts of press fit.

Still other strategies for reinforcing or enhancing press fits in machine track have also been proposed. Track pins used to couple together track links may be reinforced by the addition of snap rings, positive pin retention elements, etc. Both of these approaches add a positive stop to prevent a track link from "walking" off of a pin due to repeated alternating loads. U.S. Pat. No. 5,887,958 to Bissi et al. is directed to a track link assembly having positive pin retention. Although approaches such as that of Bissi et al. tend generally to be effective, they inherently require the use of extra parts, and can also mandate increased length and pin sizes, as well as requiring specialized tooling for assembly and manufacture.

The present disclosure is directed to one or more of the problems or shortcomings set forth above.

SUMMARY OF THE INVENTION

In one aspect, the present disclosure provides a machine having a first machine component with a bore therein, and a second machine component having a first end, a second end and a length extending between the first and second ends. One of the ends of the second machine component is retained within the bore by a press fit. The second machine component further includes a non-directional surface finish disposed along a portion of its length within the bore which is configured via the press fit to form a fluid seal with the bore, and a directional surface finish disposed along a different portion of its length within the bore which is configured via the press fit to inhibit removal of the end from the bore.

In another aspect, the present disclosure provides a method of coupling together machine components, including press fitting an end of a first machine component into a bore in a second, different machine component. Press fitting the end of the first machine component into a bore includes forming a fluid seal between the first machine component and the second machine component via a non-directional surface finish disposed along a portion of a length of the first machine component which is positioned within the bore. Press fitting the end of the first machine component into a bore further includes inhibiting removal of the end of the first machine component from the bore via a directional surface finish disposed along a different portion of the length of the first machine component which is also is positioned within the bore.

In still another aspect, the present disclosure provides a pin configured for coupling together machine components. The pin includes a cylindrical body having a first end, a second end and a length extending between the first and second ends, the body further including an outer diameter. Each of the first and second ends of the body includes a first surface finish and a second, different surface finish disposed on the outer diameter, the respective surface finishes extending along different portions of the length of the body at each of the first and second ends. The first surface finish includes a non-directional surface finish configured to form a fluid seal between the pin and a bore of a machine component via a press fit of the corresponding end of the pin within the bore. The second surface finish includes a directional surface finish configured to inhibit removal of the pin from the bore via the press fit of the corresponding end of the pin within the bore.

DETAILED DESCRIPTION

Figure 1:
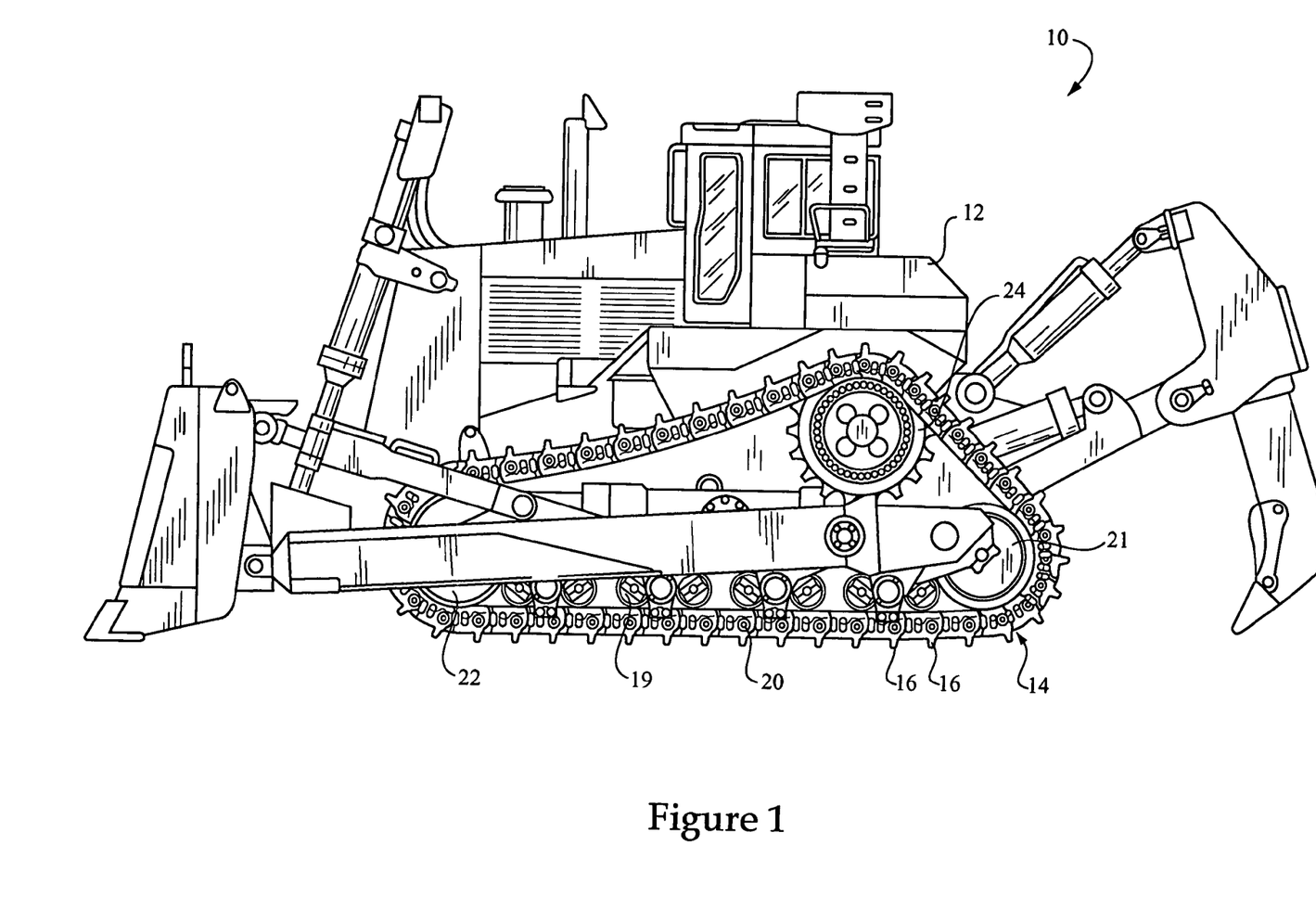
FIG. 1 is a side view of a machine according to one embodiment.

Referring to FIG. 1, there is shown a machine 10 according to the present disclosure. Machine 10 is shown in the context of a track-type machine having a frame 12 with a first track 14 disposed at a first side of frame 12, and a second track (not shown) disposed on an opposite side of frame 12. It will be understood by those skilled in the art that the respective tracks of machine 10 will typically consist of identical tracks disposed on opposite sides of frame 12 and configured to engage the ground for propelling machine 10 across a work surface. Track 14 will typically extend in an endless loop about a plurality of rolling elements, including a front idler 22, a back idler 21 and a drive roller or sprocket 24, as well as a plurality of smaller track rollers 19 disposed between front and back idlers 22 and 21. Track 14 will also typically consist of a plurality of coupled together links 16. A plurality of pins 20 are provided which may couple together at least two of the track links 16 of track 14 via one or more specialized, press fit enhancing surface finishes on each pin 20, further described herein.

While machine 10 is shown in the context of a track-type tractor, it should be understood that the present disclosure is not thereby limited, and machine 10 might alternatively comprise an excavator or any other track-type machine having ground engaging tracks. In still further embodiments, machine 10 might consist of a machine having only a single track such as a conveyor apparatus, or a machine having a track for transferring torque between rotating toothed members. Thus, it will be readily apparent that a wide variety of machine configurations, sizes and types are contemplated within the context of the present disclosure. Moreover, while the specialized surfaces finish(es) of pins 20 are amenable to practical use in coupling together machine components such as track components, the present disclosure is not thereby limited, and is contemplated to be applicable to a wide variety of machine parts and manufacturing/assembly methods wherein press fits are used.

Figure 2:
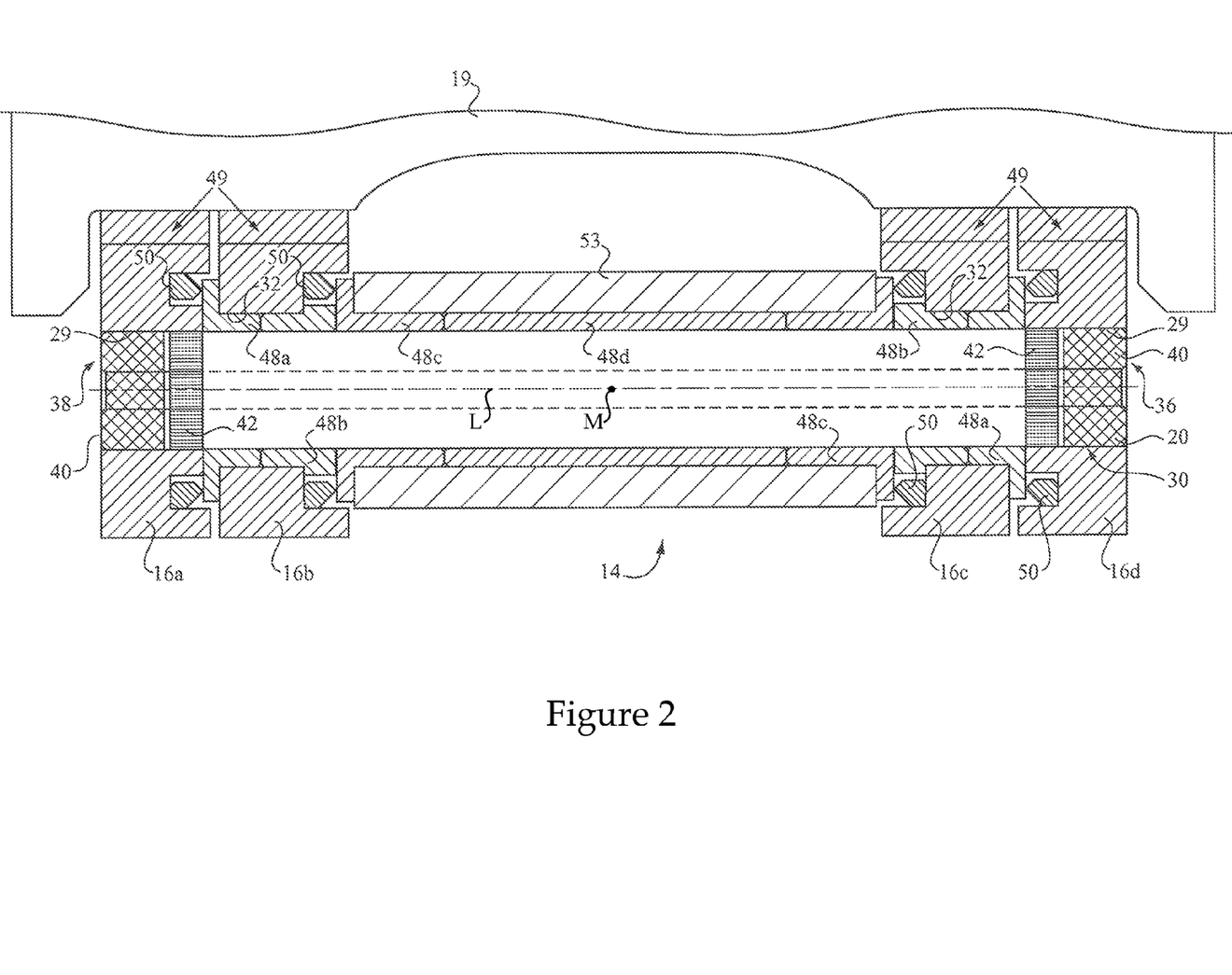
FIG. 2 is a partially sectioned view of a portion of a track according to one embodiment.

In the context of machine 10, pins 20 can achieve an enhanced press fit coupling with links 16 without the use of additional, undesired extra components, such as are used in positive pin retention strategies and the like. Turning to FIG. 2, there is shown a portion of track 14 illustrating in greater detail the geometry and configuration of certain of the components. As illustrated, track 14 may include a plurality of coupled together outboard links 16a, 16b and a plurality of coupled together inboard links 16c, 16d. In the embodiment of FIG. 2, pin 20 is shown extending through the two respective sets of coupled together links, and joins outboard link 16a with inboard link 16d. As used herein, the term "outboard" refers to features relatively further from frame 12, whereas "inboard" refers to features relatively closer to frame 12. Hence, inboard links 16c and 16d are hidden from view in FIG. 1. Pin 20 may include a first end 38 and a second end 36, the respective first and second ends 38 and 36 being press fit with outboard link 16a and inboard link 16d, respectively. In FIG. 2, identical reference numerals are used to identify identical features/components in the first set of links 16a, 16b versus the second set of links 16c, 16d.

First end 38 of pin 20 may be press fit within a bore 29 in outboard link 16a, whereas second end 36 may be press fit in another bore 29 in inboard link 16d. It should be appreciated that references herein to "ends" of pin 20 do not refer to terminal ends, but to regions proximate the ends of pin 20, as opposed to its middle. Pin 20 may be rotatably supported by bearings positioned within bores 32 disposed in each of links 16b and 16c. To this end, a plurality of bearings may be provided, including a first bearing 48a, a second bearing 48b, a third bearing 48c and a center, or fourth bearing 48d, each of which may consist of a hardened bearing such as are known in the art. Similar bearing sets may be provided on each side of fourth bearing 48d, and are numbered identically.

Each of the illustrated sets of links may respectively include rails 49 configured to engage against rollers 19 during operation of machine 10. In other words, rollers 19 may be understood as riding upon rails 49, in a conventional manner. A plurality of seals 50 are further provided, which are configured to fluidly seal certain of the spaces between and among the various components of the portion of track 14 shown in FIG. 4 to retain lubricating fluid and the like therein. Ordinarily, it will not be necessary to service track 14, the components shown in FIG. 2 in particular, during the life of track 14. It will further be noted that pin 20 includes a length dimension L extending between first end 38 and second end 36, and having a midpoint M. Pin 20 may be symmetrical about midpoint M.

In the embodiment shown in FIG. 2, pin 20 may include two different surface finishes 40 and 42 disposed at each of ends 38 and 36, the separate surface finishes being symmetrically arranged about midpoint M and disposed on an outer diameter 30 of pin 20. In particular, a non-directional surface finish 42 may be disposed along a portion of length L of pin 20 which is positioned within bore 29 of link 16a during press fitting. Pin 20 may also include a directional surface finish 40 disposed along another portion of length L of pin 20, also positioned within bore 29 of track link 16a during press fitting. Identical surface finishes 40 and 42 may be disposed at or near the opposite end 36 of pin 20, although in other embodiments pin 20 might not be symmetrical about midpoint M, and need not even include both surface finishes at each end.

Each non-directional surface finish 42 is configured to form a fluid seal with bores 29 of links 16a and 16d via the press fits between pin 20 and links 16a and 16d, akin generally to "static seals," as are commonly understood in the art. Non-directional surface finishes 42 may comprise a polished surface finish, a knurled surface finish or some other surface finish so long as it is capable of forming a fluid seal for preventing lubricating fluid and the like from leaking between pin 20 and bores 29. The term "non-directional" should be understood to refer to a surface finish that provides the same interaction with a portion of a machine component, e.g. a bore, with which it is press fit regardless of the direction of press fitting.

Directional surface finishes 40 are configured to inhibit removal of the respective ends of pin 20 from the respective links 16a and 16d. In contrast to non-directional surface finishes 42, directional surface finishes 40 would interact with bores, etc. differently depending upon the direction of press fitting. Thus, "directional" surface finishes will provide different strengths of press fit with a bore when a component upon which they are disposed is pressed into a bore from one direction versus the other direction. The relative ease of press fitting a machine component having surface finish(es) 40 would also differ based on the direction of press fitting. Directional surface finishes 40, by virtue of inhibiting removal of ends 38 and 36 from links 16a and 16d serve to couple together links 16a, 16b, 16c and 16d, as well as the bearings, a rotating bushing 53 and any other components which are positioned about pin 20. In the exemplary embodiment of FIG. 2, it will be relatively easier to move pin 20 in one direction relative to the component with which it is press fit than it will be to move pin in an opposite direction. Press fitting of pin 20 into bores 29 is thus facilitated by directional surface finish 40, but de-coupling of pin 20 from bores 29 is inhibited. This concept differs from knurling and the like, where roughening or other geometric characteristics of a particular surface supposedly enhance the grip of one component within another component. In a press fit using conventional knurling, however, the knurling of one or both components does not typically affect the interaction of press fit components, e.g. strength of the press fit, based on whether the components are pressed together in one direction versus another direction.

It may be further noted from FIG. 2 that directional surface finish 40 may extend circumferentially about pin 20. Non-directional surface finish 42 may also comprise a circumferential surface finish. The use of two different surface finishes will enable both a fluid seal, via non-directional surface finish 42, and an enhanced, robust press fit interface between pin 20 and the respective links 16a, 16d via directional surface finish 40. When pin 20 is press fit into bores 29 of outboard link members 16a and 16, interaction of surface finish 42 with portions of bores 29 will provide a sufficiently fluid tight interface that oil within and among the various components of track 14 will be substantially fluidly sealed therein, in cooperation with seals 50 and possibly other sealing components. Directional surface finish 40 will at the same time, i.e. upon creating the press fit, inhibit removal of the respective ends 38 and 36 from bores 29.

While the embodiment of FIG. 2 is shown in the context of pin 20 being press fit with links 16a and 16b, it should be appreciated that the press fit might be formed with bores 32 of links 16b and 16c in other embodiments. In such an embodiment, some additional means might be necessary for coupling links 16a and 16b with pin 20. Track 14 illustrated in FIG. 2 is of a type commonly used for track-type machines such as tractors and the like, similar to machine 10 illustrated in FIG. 1. As alluded to above, the present disclosure is not limited to any specific track design, however, or even to tracks, as will be further apparent from the following discussion.

Figure 3:
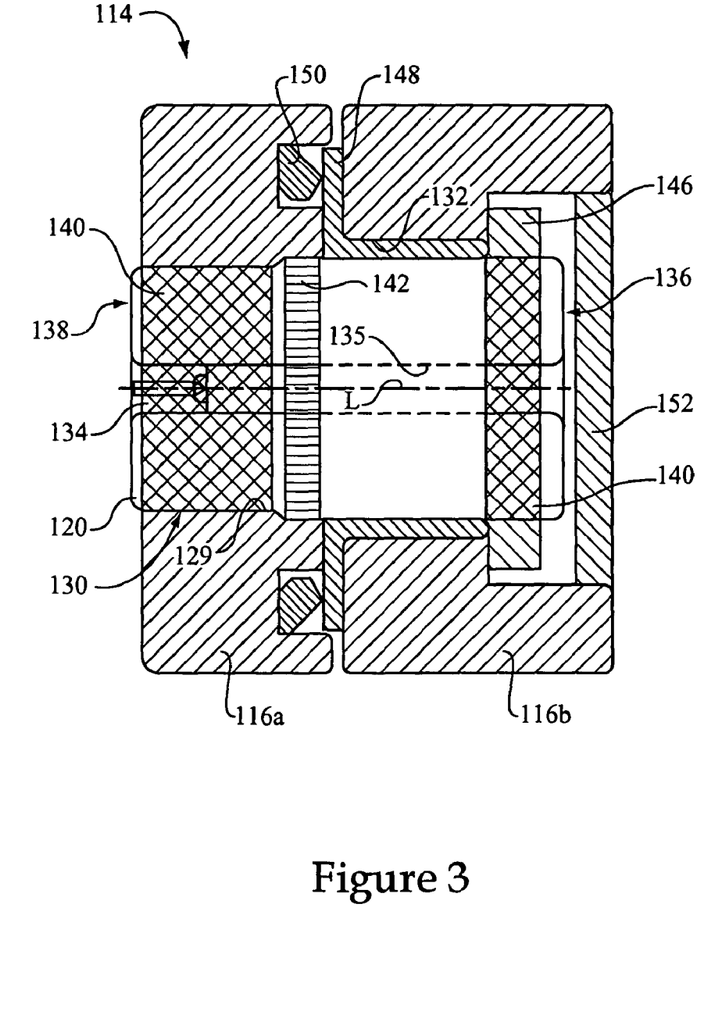
FIG. 3 is a partially sectioned view of a portion of a track according to another embodiment.

Turning to FIG. 3, there is shown a portion of a different track 114 wherein a pin 120 having certain similarities with pin 20 shown in FIG. 2 is used to couple together a first link 116a and a second link 116b. Corresponding numerals used in the FIG. 2 illustration are used in FIG. 3 to identify similar components and/or components having similar functions to those shown in FIG. 2. Pin 120 is similar to pin 20 in that it includes a first end 138 and a second end 136, a length dimension L and different surface finishes disposed along different length portions of pin 120, as further described herein. Pin 120 may include a longitudinal bore 135 for delivering lubricating fluid to components internal to links 116a and 116b. A stopper 134 may be provided for permitting access to bore 132 for this purpose. Link 116b is rotatable relative to link 116a via a bearing 148 configured to rotatably support pin 120 within a bore 132 of link 116b.

A first surface finish 142, a non-directional surface finish, may be disposed along a first portion of length L of pin 120, within a bore 129 in link 116a, and may function similarly to non-directional surface finish 42 of the FIG. 2 embodiment. The portion of length dimension L along which non-directional surface finish 142 is disposed is also positioned within bore 129 during press fitting. A second surface finish 140, a directional surface finish, also positioned within bore 129 of link 116a during press fitting, is disposed along a portion of length L which is different from that of non-directional surface finish 142.

As mentioned above, pin 120 may have its first end press fit into bore 129 of link 116a, and may have an opposite end, or a portion near its opposite end 136, positioned within bore 132 and rotatably supported in bearing 148. A fluid seal 150 may be provided between link 116a and bearing 148, or at some other location, to seal lubricating fluid within and among the components. To retain pin 120 within bore 132, a thrust washer 146 or similar element may be press fit with second end 136 of pin 120. Pin 120 may further include a directional surface finish 140 disposed proximate second end 136 to engage with thrust washer 146 and thereby inhibit removal of pin 120 from bore 132. An end cap 152 may be coupled with link 116b to fluidly seal lubricating fluid within and among the components in cooperation with seal 150. End cap 152 might include a directional surface finish about its outer periphery to inhibit de-coupling from link 116b, and could also include a non-directional surface finish for providing the fluid seal. Further still, sleeve bearing 148 might include a directional surface finish about its outer diameter to inhibit de-coupling/removal from bore 132, and could also include a non-directional surface finish.

Figure 4:
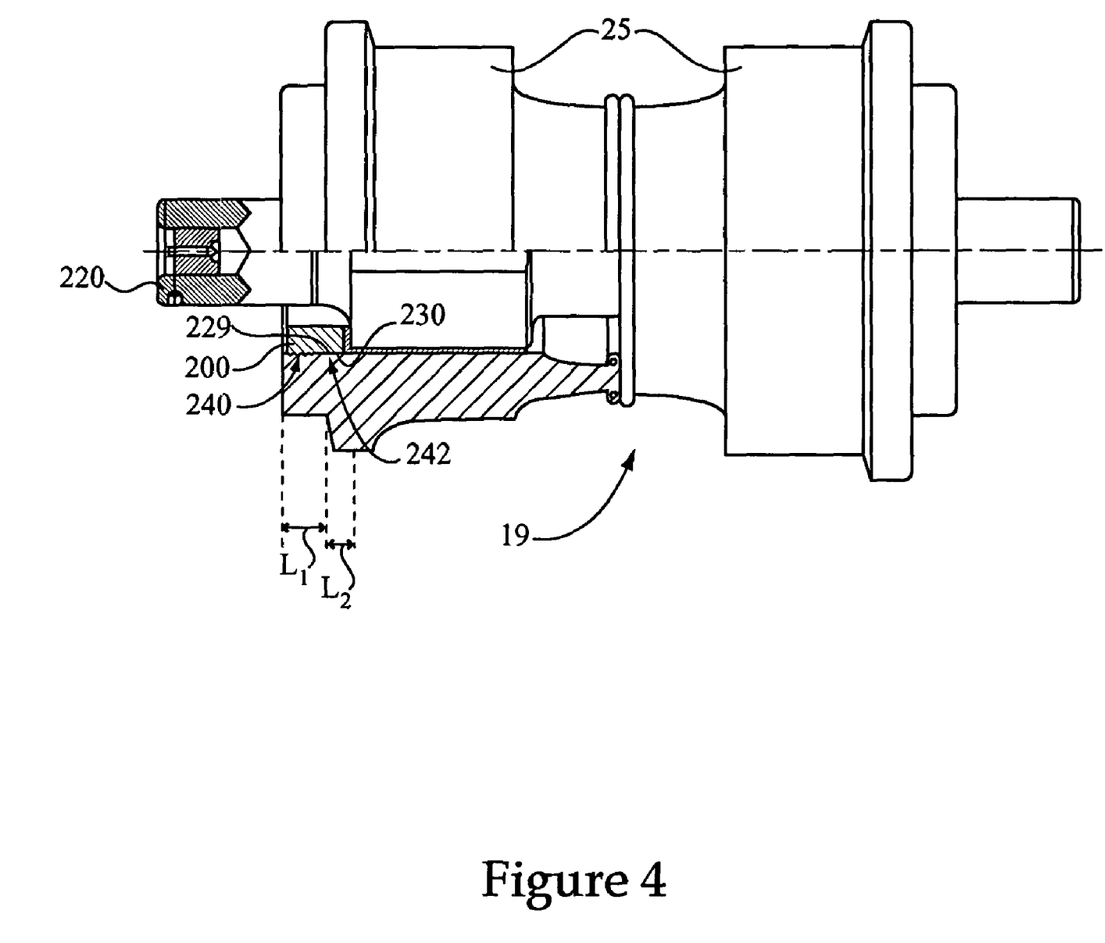
FIG. 4 is a partially sectioned view of a portion of a track roller according to one embodiment.

Turning now to FIG. 4, there is shown a track roller 19 similar to rollers 19 shown in FIG. 1. Roller 19 may include a roller shell 25, which may include two separate shell components joined together, and a retainer 220 press fit with roller shell 25. In the illustrated embodiment, roller shell 25 includes an extension 200 with a bore 229, within which retainer 220 is press fit. Retainer 220 may include a directional surface finish 240 disposed on an outer diameter 230 and extending along a first portion of its length $L_1$, and a non-directional surface finish 242 disposed on outer diameter 230 along a different portion of its length $L_2$. The separate surface finishes 240 and 242 may serve purposes similar to those of the directional and non-directional surface finishes of the foregoing embodiments, namely, inhibiting de-coupling of the components and forming a fluid seal, respectively. Roller 19 may include similar press fits between retainer 220 and shell 25 at both ends thereof, although only the press fit at the leftmost end is shown in FIG. 4. Radial dimensions of retainer 220 may be reduced as compared to known designs, and extension 200 of shell 25 may be added to known shell designs. The embodiment of FIG. 4 eliminates the need for certain drilled bores and bolts, simplifying the design over known strategies.

In still further embodiments, other components in the context of machine track might be coupled together via enhanced press fits having one or more of the specialized surface finishes disclosed herein. The present disclosure should also be understood as applicable to any press fit between machine components where both of a directional surface finish and a non-directional surface finish are desired to provide a robust press fit that also provides fluid sealing.

Figure 5A:
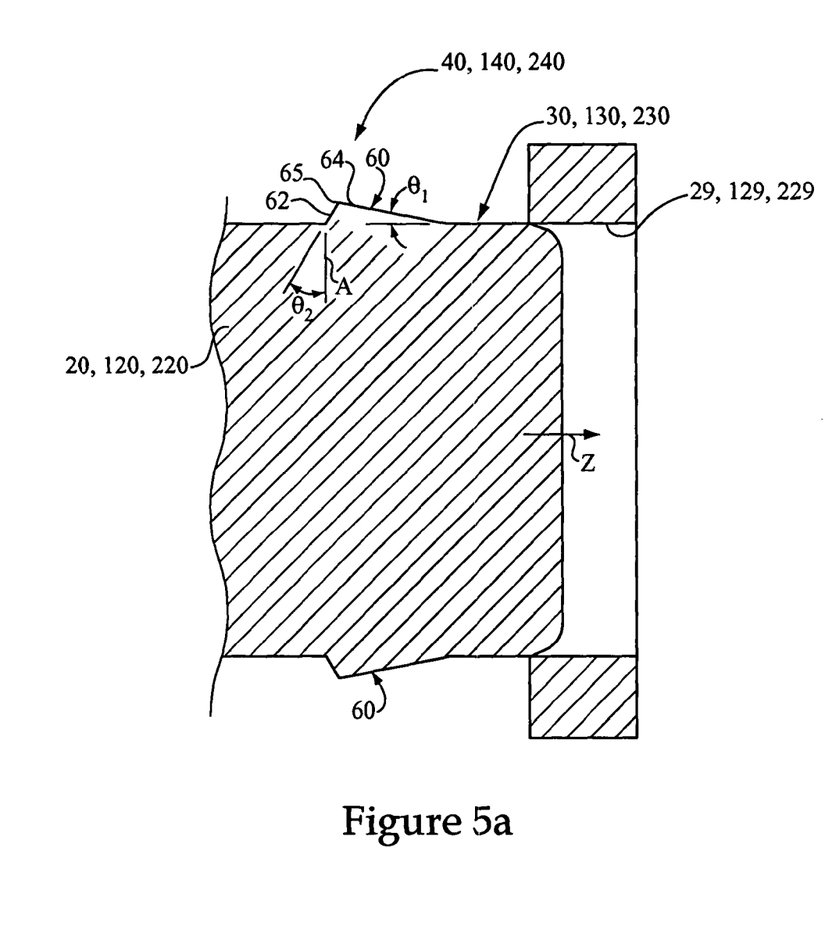
FIGS. 5a-c are partial sectioned side views of machine components according to three different embodiments.
Figure 5B:
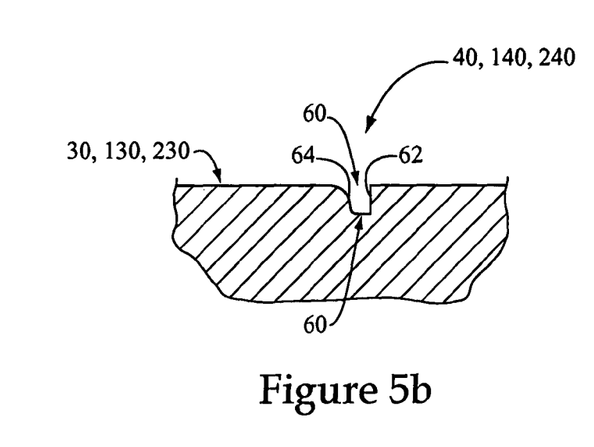
Figure 5C:
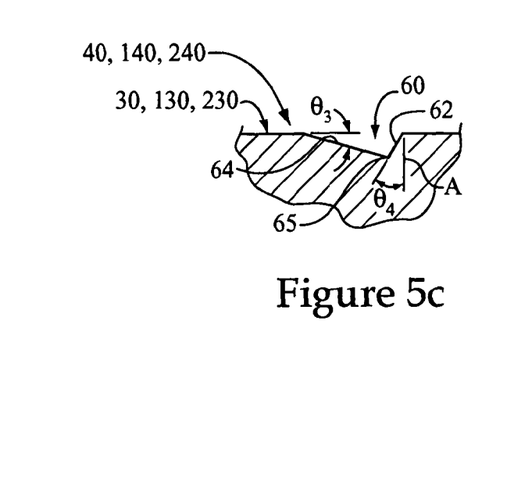

Turning to FIGS. 5a-c, there are shown different directional surface finish geometries suitable for use within the broad context of the present disclosure. As mentioned above, each directional surface finish 40, 140, 240 may comprise a circumferential surface finish about the cylindrical body of pin/retainer 20, 120, 220 at a desired location. In other embodiments, rather than being entirely circumferential, directional fit patterns for enhanced press fits might be devised according to the present disclosure which would be only partially circumferential, discontinuous, etc. For ease of manufacturing, as well as strength of the press fit, however, a fully circumferential surface finish that includes at least one annular element 60 may be used. The at least one annular element 60 may include at least one groove, for example a plurality of grooves, but might alternatively comprise a raised structure rather than a groove.

Referring in particular now to FIG. 5a, the at least one annular element 60 may consist of a raised, ridge-like structure including a first surface 64 and a second surface 62, the respective surfaces having a common edge 65, and extending circumferentially about outer diameter 30, 130, 230. In one embodiment, first surface 64 may be disposed at an average angle $\theta_1$ relative to outer diameter 30, 130, 230 of component 20, 120, 220, that is in the range of about 7° to about 10°, whereas second surface 62 may be disposed at an average angle $\theta_2$ relative to a line A normal to outer diameter 30, 130, 230 that is in the range of about 0° to about 45°, and may be between about 0° and about 30° relative to line A. It should be appreciated that the angles chosen for the relative inclination/declination of surfaces 62 and 64 may depend on the relative length of the press fit interface. A relatively long press fit interface might be achieved with the first surface 64 disposed at 7° relative to outer diameter 30, 130, 230, or even a smaller angle in certain embodiments. Thus, those skilled in the art will appreciate that the relative angles described herein are illustrative only, and may depend at least in part on the particular application, machine type and operating environment. In the FIG. 5a embodiment, edge 65 of annular element 60 may be elevated relative to outer diameter 30, 130, 230 by several thousandths of an inch, for example, between about 0.004 inches and about 0.006 inches. During press fit assembly, component 20, 120, 220 when configured as in FIG. 5a may be pressed into a receiving bore 29, 129, 229 such that surface 64 initially engages inner walls of the bore. In other words, assembly would take place by pressing component 20, 120, 220, rightward in the FIG. 5a illustration into bore 29, 129, 229, and/or pressing component 20, 120, 220 leftward. The other embodiments described hereinbelow are press fit assembled in a similar manner.

Turning to FIG. 5c, there is shown another example of an annular element 60 of a directional surface finish 40, 140, 240 wherein rather than a raised ridge-like structure as in the FIG. 5b embodiment, a groove is disposed circumferentially about component 20, 120, 220, the groove being defined by a first surface 64 and a second surface 62, having a common edge 65. Annular element 60 of FIG. 5c is generally a reflection of element 60 of FIG. 5a, but flipped left to right. First surface 64 may be disposed at an average angle $\theta_3$ relative to outer diameter 30, 130, 230 that is in the range of about 7° to about 10°, whereas second surface 62 may be disposed at an average angle $\theta_4$ relative to a line A normal to outer diameter 30, 130, 230 that is between about 0° and about 45°, and may be between about 0° and about 30°.

Turning now to FIG. 5b, there is shown yet another design for a directional surface finish 40, 140, 240 within the context of the present disclosure. In the FIG. 5b design, an annular element 60 is provided having a first surface 64 and a second surface 62. In the FIG. 5b embodiment, first surface 64 comprises a radius rather than a flat as in the embodiments of FIGS. 5a, 5c wherein relatively sharper corners are used. In the FIG. 5b embodiment, second surface 62 is disposed at an angle of about 90° relative to outer diameter 30, 130, 230, but could be at a relatively lesser or relatively greater angle. Dimensions of element 60 of the FIG. 5b embodiment may be similar to those of the FIG. 5a and 5c embodiments.

INDUSTRIAL APPLICABILITY

Referring to the drawing figures generally, when it is desirable to couple together machine components, a first machine component such as component 20, 120, 220, may be pressed into a bore 29, 129, 229. Various lubricants, heating, etc. may be employed prior to or during the press fit assembly operation. Moreover, chamfers, blends on the components, etc., may be used to facilitate engagement. It is contemplated that in certain embodiments, forming the respective surface finishes on the components may be nearly the final step in assembly, needing only the press fit itself to complete coupling together of the components. Grinding, laser cutting, EDM, or any other suitable machining strategy may be used to form surface finishes having the geometry described herein. Features such as width, type, number and spacing of annular elements 60 may be based on the desired strength of a press fits, costs, manufacturing time, etc. An area of the component may be left without a directional finish to provide the non-directional finish for sealing purposes.

The present approach, wherein assembly is completed upon press fitting, is contemplated to provide improvements over certain earlier designs wherein additional steps to reinforce press fits were necessary after the press fit itself was completed, such as the addition of snap rings, etc. Thus, in the particular context of coupling together track links, a technician can press fit links with pins having the specialized surface finishes described herein, and work his or her way down the track. Once all of the press fits are completed, track assembly will be at least substantially finished.

In any event, as press fitting progresses, directional surface finish 40, 140, 240 will begin to interact with bore 29, 129, 229 wherein the component is being pressed. In particular, component 20, 120, 220 will be pressed far enough into the receiving bore 29, 129, 229 that the at least one annular element 60 of directional surface finish 40, 140, 240 will at some point slide against inner walls of the bore 30, 130, 230.

It has been discovered that a slope of between about 7° and about 10°, e.g. the slopes associated with surfaces 64 shown in FIGS. 5a-c, may relatively easily slide past the inner walls of a bore during press fitting. Arrow Z is used in FIG. 5a to indicate an approximate direction of sliding of component 20, 120, 220 into bore 29, 129, 229. In other words, the relatively small slopes of surfaces 64 do not substantially inhibit press fitting the components. The relatively steeper slopes associated with surfaces 62 of FIGS. 5a-c, however, will have a tendency to resist de-coupling of the components once they are press fit together. In the case of the FIG. 5a embodiment, edge 65 is believed to "catch" more in a disassembly direction, i.e. when component 20, 120, 220 is pulled out of bore 29, 129, 229, than in an assembly direction. With regard to the embodiments of FIGS. 5b and 5c, the edge defined by an intersection of surfaces 62 and the outer diameter 30, 130, 230 of the respective components is believed to catch more in a disassembly direction than in an assembly direction. It may be noted from the drawings that first surface 64 defines a first line including a plurality of points of surface 64, disposed at a relatively shallower angle relative to outer diameter 30, 130, 230, in a longitudinal section plane which includes longitudinal axis M, and that second surface 62 defines a second line including a plurality of points of surface 62, disposed at a relatively steeper angle relative to outer diameter 30, 130, 230, in the section plane. The first line and second line may intersect at edge 65.

It will be recalled that non-directional surface finishes 42, 142, 242 are also disposed on components 20, 120, 220. During a press fit operation, surface finishes 42, 142, 242 will typically be pressed into bore 29, 129, 229, subsequent to engaging directional surface finish 40, 140, 240 therein, given the relative positioning of the surface finishes. In other embodiments, the non-directional surface finish might be positioned on its respective component such that it is pressed into the corresponding bore ahead of directional surface finishes 40, 140, 240. In either event, upon completion of the press fit, assembly of the subject components will be complete, providing a robust connection between the press fit parts, and also a fluid seal in one assembly step, by virtue of the use of the two different surface finishes interacting with the bore, typically a constant diameter cylindrical bore press fit with a constant diameter pin or the like.

The present description is for illustrative purposes only, and should not be construed to narrow the breadth of the present disclosure in any way. Thus, those skilled in the art will appreciate that various modifications might be made to the presently disclosed embodiments without departing from the full and fair scope of the present disclosure. For instance, while it is contemplated that the track pins described herein may replace pins using stops, snap rings, positive pin retention, etc., in other embodiments pins having the specialized surface finishes for enhanced press fits could be used in conjunction with these known strategies. Still further applications might include directional surface finishes on outer diameters of sleeve bearings 48c or 48d to enhance retention with bushing 53. Other aspects, features and advantages will be apparent upon an examination of the attached drawings and appended claims.

What is claimed is:

1. A machine comprising:
   a first machine component having a cylindrical inner wall defining a cylindrical bore having a first bore end, a second bore end and a uniform bore diameter from the first bore end to the second bore end; and
   a second machine component defining a longitudinal axis and having a first end, a second end and an axial length extending between said first and second ends, the first end being retained within said cylindrical bore by a press fit;
   said second machine component further including a non-directional surface finish disposed along a portion of its axial length within said bore which forms a fluid seal with said cylindrical bore, and a directional surface finish disposed along a different portion of its axial length within said cylindrical bore which inhibits removal of the first end from said bore, the directional surface finish being positioned adjacent the first end and including an axially asymmetric surface finish element contacting the cylindrical inner wall;
   wherein a disassembly direction is parallel the axial length of the second machine component and extends from the first end toward the second end, and an assembly direction has an orientation opposite to the disassembly direction;
   wherein the press fit includes a first press fit strength in the assembly direction, and a second press fit strength in the disassembly direction which is greater than the first press fit strength;
   wherein the axially asymmetric surface finish element includes a first surface sloping toward the longitudinal axis in the assembly direction, whereby sliding of the surface finish element against the cylindrical inner wall in the assembly direction is uninhibited during press fitting the first and second machine components together;
   wherein the axially asymmetric surface finish element further includes a second surface adjoining the first surface and sloping toward the longitudinal axis in the disassembly direction, whereby sliding of the surface finish element against the cylindrical inner wall in the disassembly direction is inhibited once the first and second machine components are press fit together; and
   wherein a slope of the second surface is steeper than a slope of the first surface, relative to the longitudinal axis.

2. The machine of claim 1 further comprising a frame and at least one track coupled with said frame, said at least one track comprising a plurality of track components, said first and second machine components each comprising one of said track components.

3. The machine of claim 2 wherein:
   said at least one track includes a plurality of links;
   said first machine component comprises one of the links of said track; and
   said second machine component comprises a pin configured to couple the one of the links with a second one of the links of said track.

4. The machine of claim 3 further comprising a plurality of identical pins, said second machine component comprising one of said identical pins, and each pin coupling together at least two of the links of said track.

5. The machine of claim 4 comprising a track-type machine wherein said at least one track includes a first ground engaging track of the machine and a second ground engaging track of the machine, the first and second ground engaging tracks being disposed at opposite sides of said frame.

6. The machine of claim 5 wherein the directional surface finish of each of said pins comprises a circumferential surface finish that includes at least one annular element comprising the axially asymmetric surface finish element.

7. The machine of claim 3 wherein the first surface comprises a first annular surface defining a first line which includes a plurality of points on the first annular surface in a longitudinal section plane which includes the longitudinal axis, and the second surface comprises a second annular surface defining a second line which includes a plurality of points on the second annular surface in the longitudinal section plane, and wherein the second surface having a common edge with said first surface at an intersection between the first line and the second line, the common edge being disposed at a location spaced from an outer diameter of the second machine component in a direction normal to the outer diameter a distance equal to between about 0.0004 inches and about 0.0006 inches.

8. The machine of claim 7 wherein the at least one annular element of the directional surface finish comprises at least one groove.

9. The machine of claim 7 wherein each of the directional surface finish and the non-directional surface finish are located on a first side of a midpoint of the axial length of the corresponding pin, and wherein each of the pins further includes a non-directional surface finish and a directional surface finish located on a second side of the midpoint of the axial length of the corresponding pin.

10. The machine of claim 2 wherein the plurality of track components comprises a plurality of identical track rollers each having at least one shell and a retainer, said first and second machine components comprising the at least one shell and retainer of one of said rollers.

11. The machine of claim 2 wherein the plurality of track components comprises a plurality of identical pins and a plurality of identical sleeve bearings each configured to rotatably support an end of one of said pins, said first and second machine components comprising one of said pins and one of said sleeve bearings.

12. A method of coupling together machine components comprising the steps of:

press fitting an end of a first machine component in an assembly direction into a bore in a second, different machine component;

wherein the press fitting step includes forming a fluid seal between the first machine component and the second machine component by way of a non-directional surface finish disposed along a portion of a length of the first machine component which is positioned within the bore; and wherein the press fitting step further includes inhibiting removal of the end of the first machine component from the bore by way of a directional surface finish disposed along a different portion of the length of the first machine component which is also positioned within the bore;

wherein the press fitting step further includes establishing a first press fit strength between the first machine component and the second machine component in the assembly direction based on an interaction between the directional surface finish and the bore, including sliding a machined corner of the directional surface finish against a cylindrical inner wall of the bore in the assembly direction;

wherein the press fitting step further includes establishing a second, greater press fit strength between the first machine component and the second machine component in a disassembly direction which is opposite the assembly direction based on an interaction between the directional surface finish and the bore, including contacting the directional surface finish with the cylindrical inner wall such that catching of the machined corner against the cylindrical inner wall in the disassembly direction resists decoupling of the first and second machine components.

13. The method of claim 12 wherein the press fitting step includes press fitting an end of a pin into a bore in a track link.

14. The method of claim 13 wherein the end of the pin comprises a first end, the method further comprising a step of press fitting a second end of the pin into another bore disposed in a third machine component, wherein press fitting the second end of the pin includes inhibiting removal of the second end from the another bore by way of another directional surface finish disposed along a portion of the length of the pin which is positioned within the another bore.

15. A pin configured for coupling together machine components comprising:

a cylindrical body defining a longitudinal axis and having a first end, a second end and an axial length extending between said first and second ends, said body further including an outer diameter;

wherein each of the first and second ends of said body includes a first surface finish and a second, different surface finish disposed on said outer diameter, the respective surface finishes extending along different portions of the axial length of said body at each of the first and second ends;

said first surface finish comprising a non-directional surface finish configured to form a fluid seal between said pin and a bore of a machine component having a press fit with the corresponding end of the pin;

said second surface finish comprising a directional surface finish configured to inhibit removal of said pin from the corresponding bore, the directional surface finish including an axially asymmetric surface finish element having a first machined surface, a second machined surface separate from the first surface, and a machined corner positioned adjacent the second machined surface;

the first end and the second end of the pin each having means, including the first machined surface, the second machined surface and the machined corner, for establishing a first press fit strength between the pin and the machine component in an assembly direction and a second press fit strength between the pin and the machine component in a disassembly direction which is greater than the first press fit strength;

the first machined surface sloping toward the longitudinal axis in an outboard direction and defining a first line in a section plane which includes the longitudinal axis, the first line including a plurality of points on the corresponding first machined surface;

the second machined surface sloping toward the longitudinal axis in an inboard direction and defining a second line in the section plane, the second line intersecting the first line at the machined corner and including a plurality of points on the corresponding second machined surface, and the second machined surface having a common edge with the first machined surface at the machined corner; and a slope of the second surface is steeper than a slope of the first surface, relative to the longitudinal axis, such that the second line slopes more steeply toward the longitudinal axis than the first line.

16. The pin of claim 15 wherein said surface finish element comprises at least one annular element about the outer diameter of said pin.

17. The pin of claim 16 wherein:

said at least one annular element comprises a plurality of annular elements;

each respective first surface is disposed at an angle between about seven degrees and about ten degrees relative to the outer diameter of said pin; and each respective second surface is disposed at an angle between about ninety degrees and about thirty degrees relative to a line oriented normal to the outer diameter of said pin.

* * * * *